United States Patent
Rezvani

(10) Patent No.: US 7,106,789 B1
(45) Date of Patent: Sep. 12, 2006

(54) METHOD AND APPARATUS FOR PROVISIONING TDM AND PACKET BASED COMMUNICATIONS ON A VDSL COMMUNICATION MEDIUM

(75) Inventor: Behrooz Rezvani, Pleasanton, CA (US)

(73) Assignee: Ikanos Communication Inc, Fremont, CA (US)

( * ) Notice: Subject to any disclaimer, the term of this patent is extended or adjusted under 35 U.S.C. 154(b) by 623 days.

(21) Appl. No.: 09/779,790

(22) Filed: Feb. 7, 2001

Related U.S. Application Data

(63) Continuation of application No. 09/728,300, filed on Dec. 1, 2000, now abandoned.

(60) Provisional application No. 60/168,466, filed on Dec. 1, 1999.

(51) Int. Cl.
H04B 1/38 (2006.01)

(52) U.S. Cl. .................. 375/222; 375/240; 370/352; 370/466; 370/493

(58) Field of Classification Search ............. 375/222, 375/219, 220, 354, 240; 370/226, 352, 540, 370/347, 353, 354, 535, 466, 454, 493; 379/29.01; 709/227

See application file for complete search history.

(56) References Cited

U.S. PATENT DOCUMENTS

| | | | |
|---|---|---|---|
| 5,661,778 A * | 8/1997 | Hall et al. ............. | 379/29.01 |
| 5,719,858 A * | 2/1998 | Moore .................... | 370/347 |
| 5,771,236 A | 6/1998 | Sansom et al. ......... | 370/458 |
| 6,070,192 A * | 5/2000 | Holt et al. .............. | 709/227 |
| 6,148,006 A | 11/2000 | Dyke et al. ............. | 370/480 |
| 6,188,669 B1 | 2/2001 | Bellenger ............... | 370/230 |
| 6,208,637 B1 * | 3/2001 | Eames .................... | 370/352 |
| 6,208,670 B1 * | 3/2001 | Milliron et al. ........ | 370/540 |
| 6,373,838 B1 * | 4/2002 | Law et al. .............. | 370/352 |
| 6,385,194 B1 * | 5/2002 | Surprenant et al. .... | 370/353 |
| 6,625,116 B1 * | 9/2003 | Schneider et al. ..... | 370/226 |
| 6,674,750 B1 * | 1/2004 | Castellano ............. | 370/354 |

* cited by examiner

Primary Examiner—Chieh M. Fan
Assistant Examiner—Eva Zheng
(74) Attorney, Agent, or Firm—IP Creators; Charles C Cary

(57) ABSTRACT

An method and apparatus for provisioning multiple Next and fractional T1 along with packet based communications over a shared X-DSL communication link is disclosed. The communication link may be wired or wireless. The current invention provides a method and apparatus for flexibly provisioning businesses and other high bandwidth users, with multiple communication channels and multiple service types, both packet based and SDM/TDM. An efficient and configurable method and apparatus for multiplexing of both packets and STM channels on to a single VDSL frame is disclosed. At the receiver in the NT the VDSL receiver as explained is configured to de-multiplex individual channels and route them to individual users/suits within the building.

6 Claims, 5 Drawing Sheets

METHOD AND APPARATUS FOR PROVISIONING TDM AND PACKET BASED COMMUNICATIONS ON A VDSL COMMUNICATION MEDIUM

CROSS REFERENCE TO RELATED APPLICATION

This application is a continuation of U.S. application Ser. No. 09/728,300 filed Dec. 1, 2000 entitled "METHOD AND APPARATUS FOR INTERFERENCING TDM AND PACKET BASED COMMUNICATION ON A VDSL COMMUNICATION MEDIUM" now abandoned which claims the benefit of prior filed Provisional Applications No. 60/168,466 filed on Dec. 1, 1999 entitled "nT1, FT3, T3, Over Symmetrical VDSL". Each of the above-cited applications is incorporated herein by reference in its entirety.

BACKGROUND OF THE INVENTION

1. Field of Invention

The present invention relates in general the communications systems and is particularly directed to a mechanism for providing NxT1, fractional T1 and packet based services over symmetric X-DSL protocols.

2. Description of the Related Art

North American Integrated Service Digital Network (ISDN) Standard, defined by the American National Standard Institute (ANSI), regulates the protocol of information transmissions over telephone lines. In particular, the ISDN standard regulates the rate at which information can be transmitted and in what format. ISDN allows full duplex digital transmission of two 64 kilo bit per second data channels. These data rates may easily be achieved over the trunk lines, which connect the telephone companies' central offices. The problem lies in passing these signals across the subscriber line between the central office and the business or residential user. These lines were originally constructed to handle voice traffic in the narrow band between 300 Hz to 3000 Hz at bandwidths equivalent to several kilo baud.

Digital Subscriber Lines (DSL) technology and improvements thereon including: G.Lite, ADSL, VDSL, HDSL all of which are broadly identified as X-DSL have been developed to increase the effective bandwidth of existing subscriber line connections, without requiring the installation of new fiber optic cable. An X-DSL modem operates at frequencies higher than the voice band frequencies, thus an X-DSL modem may operate simultaneously with a voice band modem or a telephone conversation. The available rates for X-DSL communications are increasing with each new standard. Currently there are over ten discrete X-DSL standards, including: G.Lite, ADSL, VDSL, SDSL, MDSL, RADSL, HDSL, etc.

Typically provisioning of any one of the standards is directed to the provision of a specific type of service, e.g. video on demand. What is needed are more flexible ways of provisioning data across these increasingly high bandwidth X-DSL inks.

SUMMARY OF THE INVENTION

An method and apparatus for provisioning multiple Next and fractional T1 along with packet based communications over a shared X-DSL communication link is disclosed. The communication link may be wired or wireless. The current invention provides a method and apparatus for flexibly provisioning businesses and other high bandwidth users, with multiple communication channels and multiple service types, both packet based and SDM/TDM. An efficient and configurable method and apparatus for multiplexing of both packets and SDM/TDM channels on to a single VDSL frame is disclosed. At the receiver in the NT the VDSL receiver is configured to de-multiplex individual channels and route them to individual users/suits within the building.

BRIEF DESCRIPTION OF THE DRAWINGS

These and other features and advantages of the present invention will become more apparent to those skilled in the art from the following detailed description in conjunction with the appended drawings in which.

DETAILED DESCRIPTION OF THE EMBODIMENTS

As the penetration of fiber into the local loop increases a whole set of new services will become available. The nature of services offered by local telephone operator varies from customer to customer. One particular set of applications is related to the delivery of high speed data and voice over VDSL to businesses and other high bandwidth users. VDSL for example carries high data rates (6–50 Mbits symmetric) over copper from an Optical Network Unit (ONU) to a Network Terminal (NT) located in the wiring closet or Basement. Typically in a building where the NT is located there night be any number of business suits/users with different size and with different service needs. However two are fundamental challenges:

There will be two types of traffic: SDM/TDM and packet based

2. The traffic offered will be bursty in nature

The current invention provides a method and apparatus for flexibly provisioning businesses and other high bandwidth users, with multiple communication channels and multiple service types, both packet based and SDM/TDM. An efficient and configurable method and apparatus for multiplexing of both packets and SDM/TDM channels on to a single VDSL frame is disclosed. At the receiver in the NT the VDSL receiver as explained here has de-multiplex data and route them to individual users/suits within the building.

Figure 1:
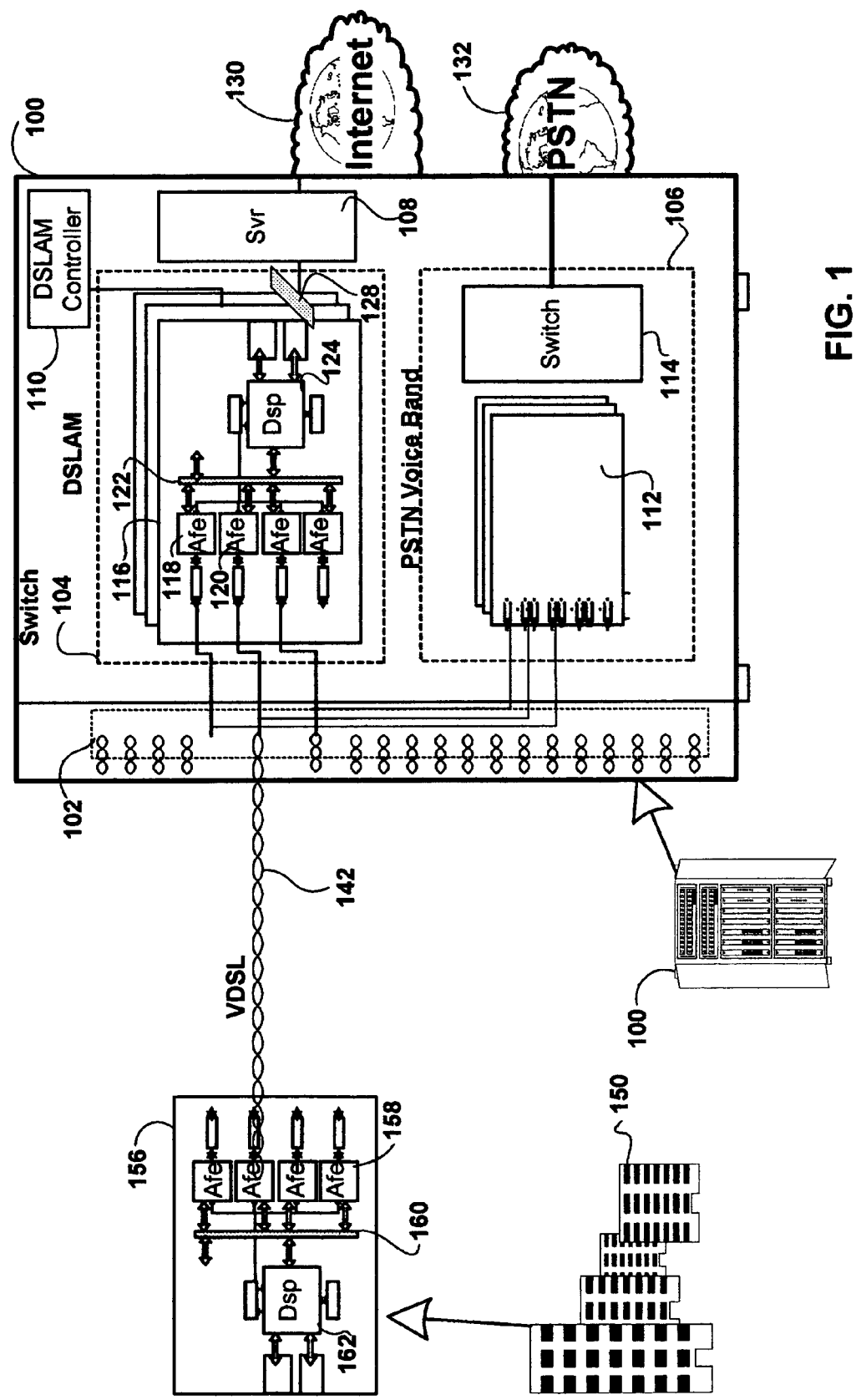
FIG. 1 shows a communication system with a pair of multi-mode multi-channel modem line cards coupled to one another over a subscriber line between a public switched telephone network (PSTN) central office (CO) and a remote site.

FIG. 1 shows a communication system with a pair of multi-mode multi-channel modem line cards coupled to one another by a binder of subscriber lines between a public switched telephone network (PSTN) central office (CO) and a remote site. The system includes a CO 100 and a remote line card 156 positioned at a remote terminal 150.

Each of the subscriber line connections terminates on the CO end, in the frame room 102 of the CO. From this room connections are made for each subscriber line via splitters and hybrids to both a DSLAM 104 and to the voice band racks 106. The splitter shunts voice band communications to dedicated line cards, e.g. line card 112 or to a voice band modem pool (not shown). The splitter shunts higher frequency X-DSL communications on the subscriber line to a selected line card, e.g. line card 116, within DSLAM 104. The line cards of the current invention are universal, meaning they can handle any current or evolving standard of X-DSL and may be upgraded on the fly to handle new standards.

Voice band call set up is controlled by a Telco switch matrix 114 such as SS7. This makes point-to-point connections to other subscribers for voice band communications across the public switched telephone network 132. The X-DSL communications may be processed by a universal line card such as line card 116. That line card includes a plurality of AFEs 118–120 each capable of supporting a plurality of subscriber lines. The AFEs are coupled via a packet based bus 122 to the DSP 124. For downstream communications from the CO to the remote site, the DSP modulates the data for each communication channel, the AFE transforms the digital symbol packets assembled by the DSP and converts them to an analog signal which is output on the subscriber line associated with the respective channel. The DSP is capable of multi-protocol support for all subscriber lines to which the AFEs are coupled. Communications between AFEs and DSP(s) may be packet based, in which embodiment of the invention a distributed architecture such as will be set forth in the following FIG. 2 may be implemented. The line card 116 is coupled to a back-plane bus 128 which may be capable of offloading and transporting low latency X-DSL traffic between other DSPs for load balancing. The back-plane bus of the DSLAM also couples each line card to the Internet 130 via server 108. Each of the DSLAM line cards operates under the control of a DSLAM controller 110 which handles global provisioning, e.g. allocation of subscriber lines to AFE and DSP resources. The various components on the line card form a plurality of logical modems each handling upstream and downstream communications across corresponding subscriber lines. When an X-DSL communication is established on a subscriber line, a specific channel identifier is allocated to that communication. That identifier is used in the above mentioned packet based embodiment to track each packet as it moves in an upstream or downstream direction between the AFE and DSP.

At the remote site a similar line card architecture is shown for line card 156 which forms a plurality of logical modems connected to subscriber lines, e.g. subscriber line 142. That line card includes AFEs 158, a packet bus 160 and a DSP 162. In an alternate embodiment of the invention the termination at the remote site 150 would be a set of discrete modems each coupled to an associated one of the subscriber lines rather than the logical modem shown. These modules, AFE and DSP, may be found on a single universal line card, such as line card 116 in FIG. 2. They may alternately be displaced from one another on separate line cards linked by a DSP bus. In still another embodiment they may be found displaced from one another across an ATM network. There may be multiple DSP chipsets on a line card. In an embodiment of the invention the DSP and AFE chipsets may include structures set forth in the figure for handling of multiple line codes and multiple channels.

In the operational phase upstream and downstream communication channels pass across the bus 122 between the AFEs 118–120 and the DSP. Each downstream packet passes directly from the DSP to the appropriate AFE. Each upstream packet which is placed on the bus by the AFEs passes to the DSP.

Figure 2:
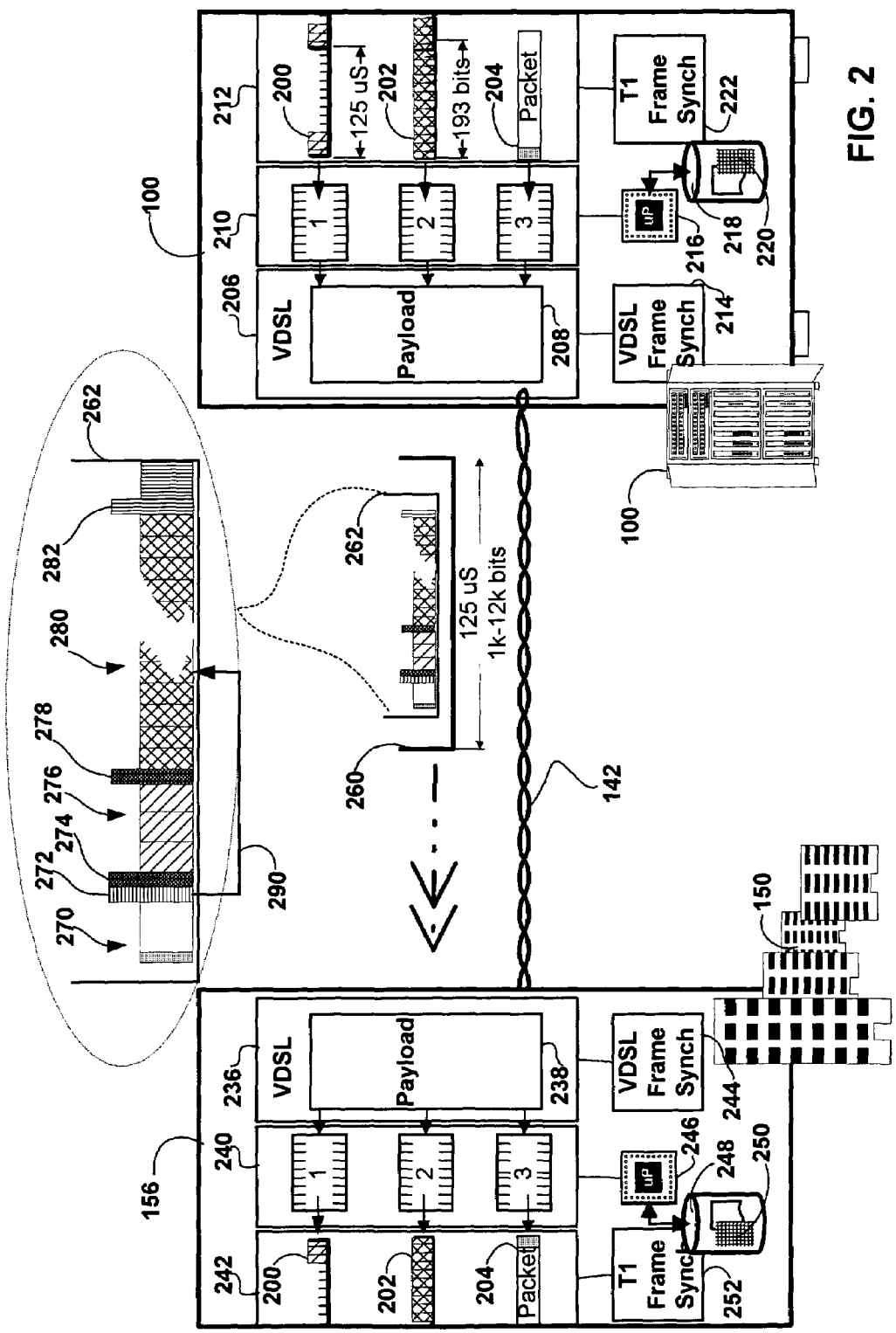
FIG. 2 shows is a detailed hardware block diagram of the transport layer functionality for providing multiple discrete time division multiplexed and packet based communication channels over a symmetric X-DSL communication link.

FIG. 2 shows a transport layer view of the system shown in FIG. 1. The central office 100 remote site 150 and subscriber lines 148 are shown. The central office accepts multiple TDM/SDM channels 200–202 as well as packet based channels 204. These are input 212 to corresponding buffers within buffer bank 210. The combined VDSL framer 206 and the payload framer 208 operate to maintain TDM throughput in a manner which will be discussed in the following FIGS. 3–5. The incoming TDM traffic operates off a T1 frame synchronizer 222. The downstream and upstream VDSL framer operates off a VDSL frame synchronizer 214. The payload framer loads the payload portion 262 of the VDSL frame 260 with packet based and TDM/SDM channels and maintains the throughput and synchronicity in doing so. In the embodiment shown the payload packet includes a packet portion 270 a start of frame header 272 and associated pointer 290. A series of TDM frame headers, one per channel, e.g. headers 274 and 278 proceed the corresponding DS0s 276 and 280. The end of the TDM payload portion has an end of frame mark 282. This is followed by stuffing bits. At the remote site 150 similar elements exist. In the embodiment shown the deframing functions and synchronization functions are shown. The incoming VDSL frames are defamed by the combined VDSL and payload deframers 236 and 238. The payload deframer places TDM frames in the appropriate channel buffers 240. These are re-framed as TDM data within output buffer 242 which operates under control of phase synchronous T1 frame synchronizer 252.

Figure 3A:
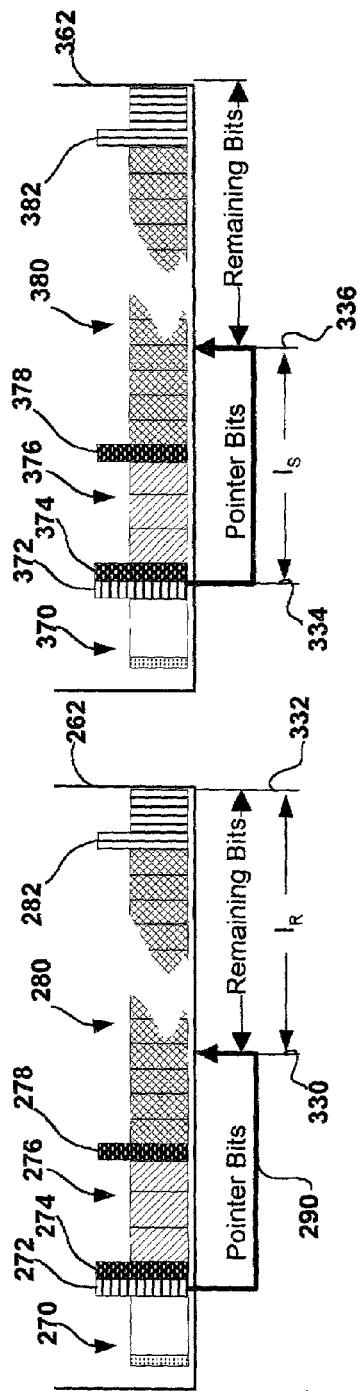
FIG. 3A shows a sequential TDM payload frames structure which allows demultiplexing of the multiple channels and TDM frame synchronization at the remote site.
Figure 3B:
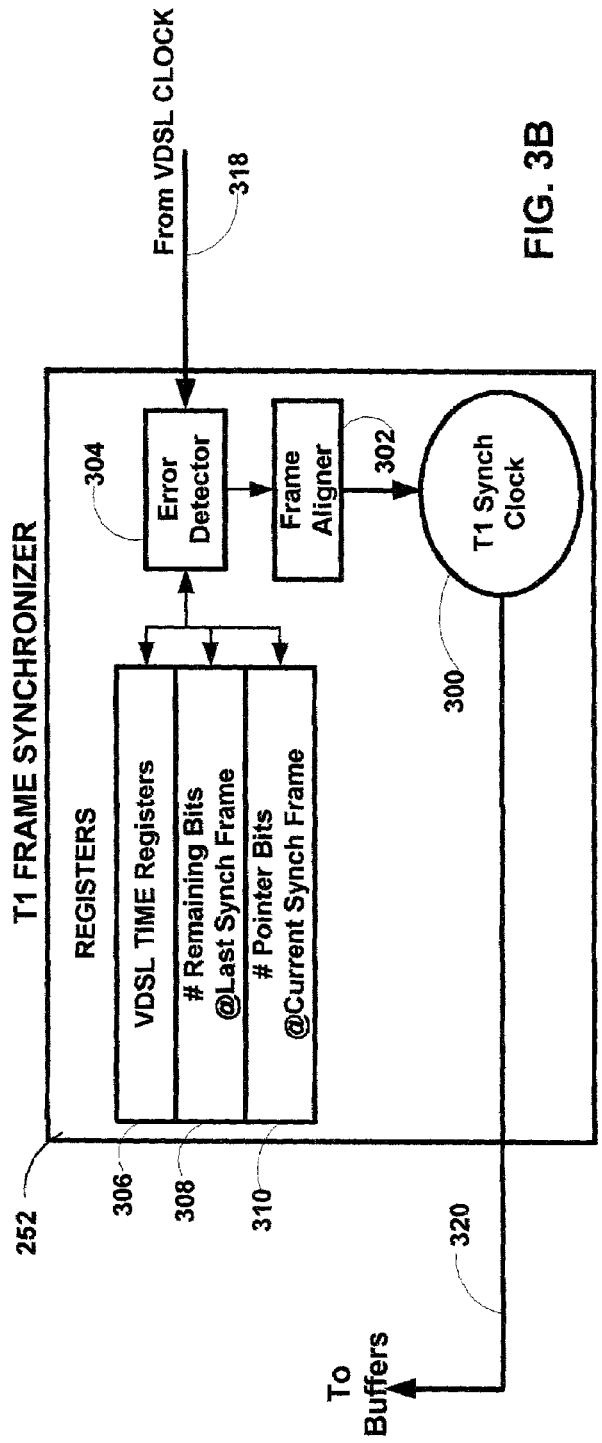
FIG. 3B is a hardware block diagram of the TDM frame synchronizer shown in FIG. 2.

FIG. 3A shows successive frames in which the time interval IR for the remaining bits and Is for the start bits are identified. These time intervals coincide with the VDSL clock readings at times 330 through 332 and 334 through 336 respectively.

The T1 frame synchronizer 252 includes VDSL time registers 306, a remaining bit register 308, a pointer bit register 310 and error detector 304 and a frame aligner 302. the error detector utilizing processes set forth in the following FIG. 5 determines the T1 frame error using headers in the payload discussed above. The time in which the VDLS clock registers the processing of the bits is compared with the required T1 time of 125 us and the error is used by the frame aligner to synchronize the T1 clock 300 and or the VDSL clock (not shown). The frame boundary is then resynchronized.

Figure 4:
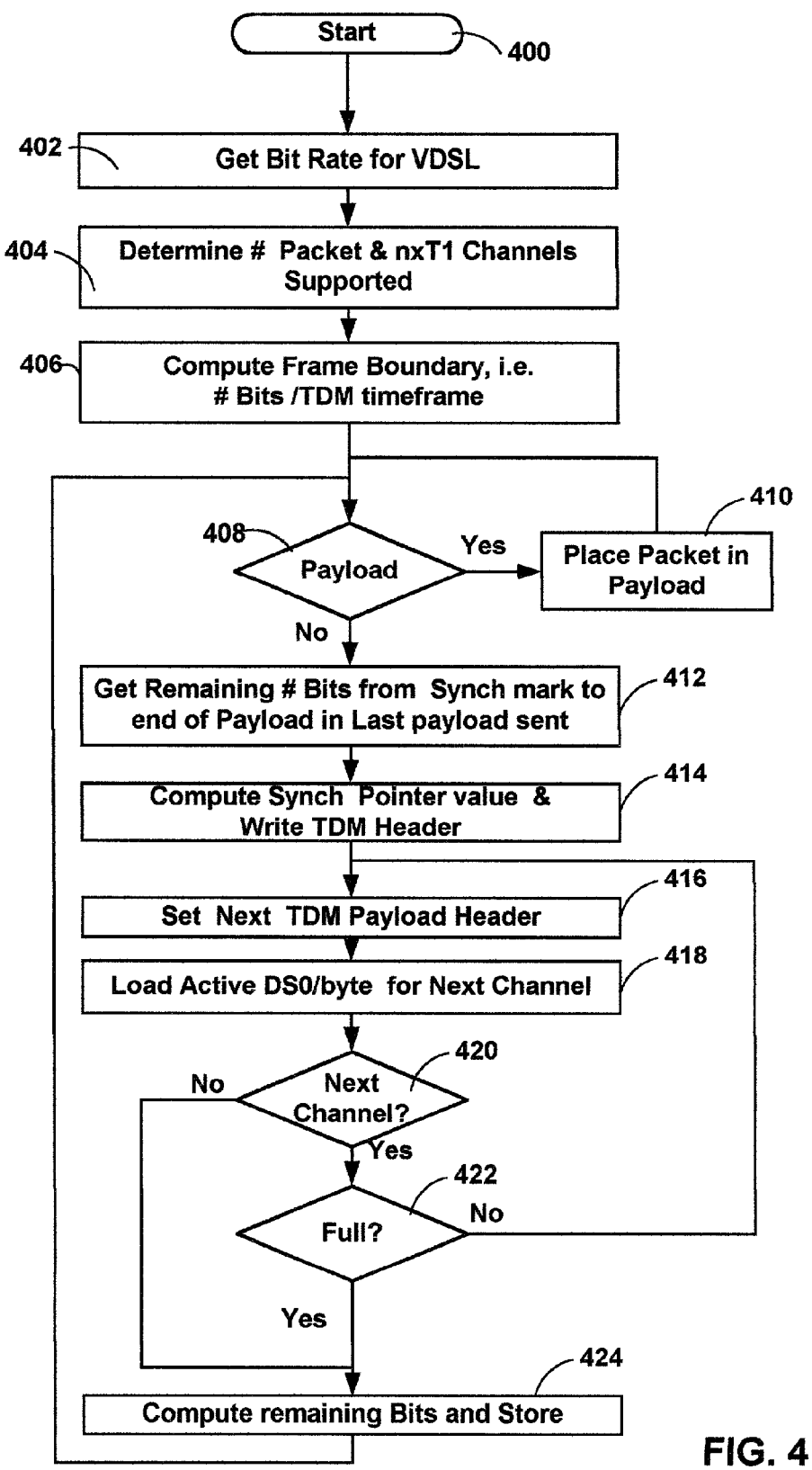
FIG. 4 is a process flow diagram for the payload framer shown in FIG. 2.

FIG. 4 shows the processes associated with an embodiment of the payload framer 208 shown in FIG. 2. Processing begins to start block 400. After initialization control passes to process block 402. The process block 402. In process 402 the current bit rate for the VDSL subscriber line is determined using the available symbol rate and the number of bits per symbol. The product will vary depending on the length of service, line quality, etc. Control then passes to process 404.

In process 404 a determination is made as to how many of the existing packet based and TDM channels the subscriber line can handle with an appropriate safety margin and with allowance for overhead associated with the payload packet structure discussed above. This determination involves comparing the demand for each channel, including for packet based channels the quality of service requirements, with the available bit rate calculated in process 404 above. All TDM channels must be delivered to the remote site at a rate which allows synchronization of the TDM frames at the remote with the frames at the CO. The TDM timeframe in the case of T1 is 125 us per DS0. The T1 frame contains 193 bits per frame with 24 DS0 time slots each of which contain 1 byte. A VDSL frame, e.g. a DMT frame, is only 25 us in length but has a high bandwidth and thus can carry from 1000 to 15000 bits in that time interval. Thus multiple packet based and TDM based channels may be carried in a single DMT frame. Once provisioning is complete control is passed to process 406.

In process 406 the payload frame boundaries are determined. This includes determining the #bits between synchronization flags, including all TDM headers. This sum equals the number of pointer bits and remaining bits shown in FIG. 3A. Control is then passed to decision process 408.

In decision process 408 a determination is made as to what if any packet based channels will be included in the frame. This determination may be based on an estimate of the leftover space after accounting for all TDM channel requirements and the quality of service requirements for the existing packet based channels. If payload is available control passes to process 410 in which the packets are loaded in the payload 270 with their existing headers. Once packet loading is complete control passes to process 412. In process 412 the remaining bits from the previous frame are determined. Then in process 412 the remaining bits are subtracted in process 414 from the number of bits within the frame boundary as computed in process 406 above. The resultant is the current value for the payload pointer for the next payload header. The TDM payload header 272/372 (See FIG. 3A) is written to the payload along with the bit pattern which will allow it to be recognized by the deframer at the remote site. Control is then passed to process 416.

In process 416 the next TDM payload header for the next channel is written to the payload. This Channel header, e.g. header 274/278 (See FIG. 3A) includes a recognizable bit pattern and a channel identifier. Control is then passed to process 418 in which the DS0s or bytes associated with the channel identified in the header is written to the payload. If the channel is provisioned for fractional T1 service then only the subscribed for number of DS0s or bytes are written to the payload. If the channel is provisioned for T1 service then the number of DS0s or bytes which are written to the payload is 24 bytes plus one control bit which is equal to 193 bits for one complete frame.

In decision process for 420 a determination is made as to whether all provisioned channels have been packet in the payload with their corresponding channel headers. If not then control is passed to decision process 422 to determine if the payload has been overprovisioned. If it has not then control returns to process 416 for the placement of the next TDM header. Once all channels have been provisioned control returns to process 424. In process 424 an end of TDM payload marker e.g. marker 282 (See FIG. 3A) is placed in the frame. Then the number of bits including TDM headers, payloads and the marker is computed and added to the number of pointer value computed in process 414 above. If the sum is less than the number of bits computed in process 406 for the frame boundary then stuffing bits are placed in the payload. Control then returns to process 408 for the next "round robin" provisioning of all channels on the next VDSL frame.

In another implementation of the above instead of serving higher priority channels first, all channels will be served in 125 us and then any higher priority channels will get the remaining payload capacity. In all embodiments the key item is the proper calculation of pointer which has to take into account all the header and routing bytes of each channel as well as stuffing bits and end of packet flag bits. It is also necessary to determine whether the pointer is looking forward or to its previous frame.

Figure 5:
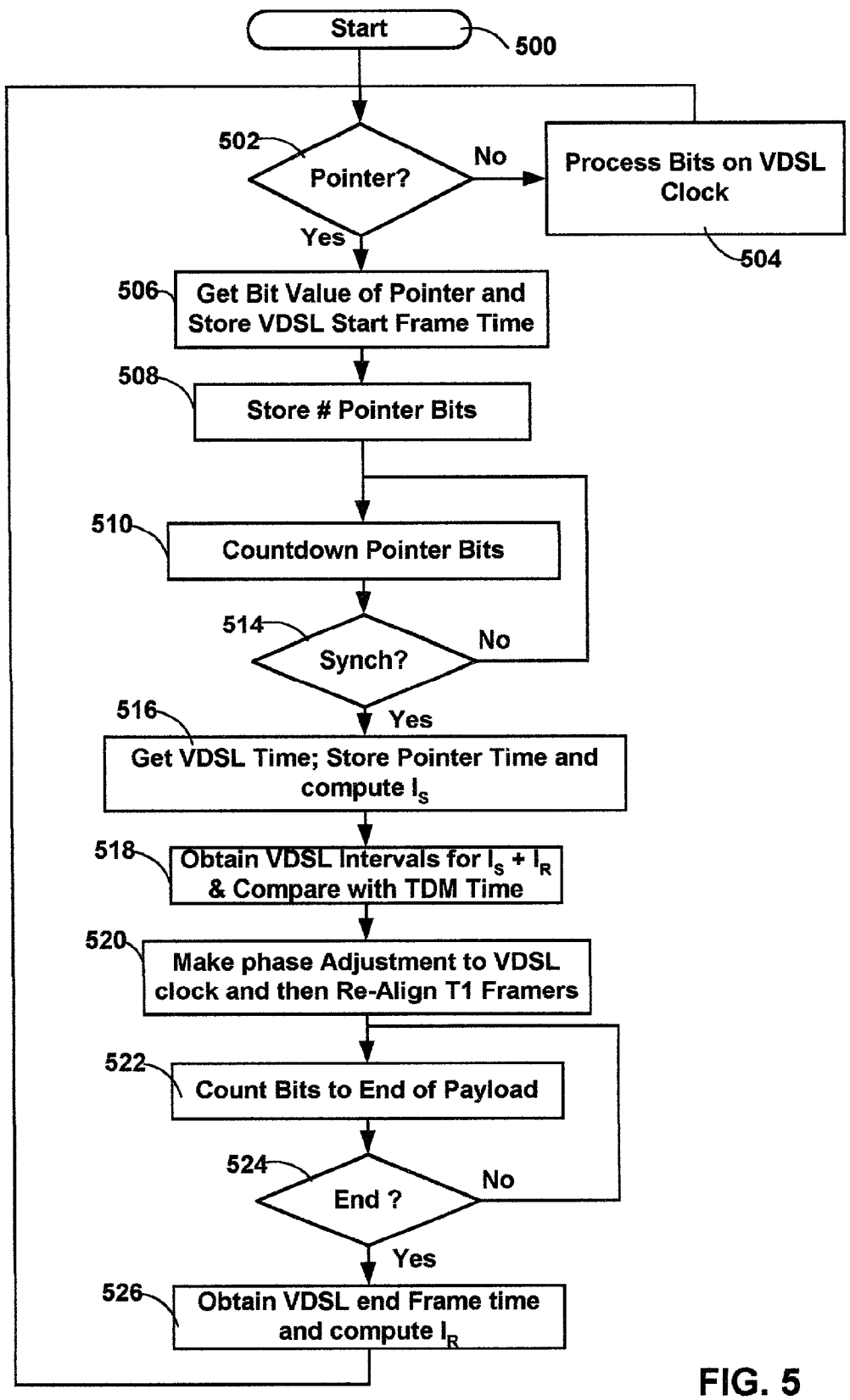
FIG. 5 is a process flow diagram for the T1 frame synchronizer shown in FIG. 2.

FIG. 5 shows the processes associated with the T1 frame synchronizer 252 located at the remote site (see FIG. 2). These processes allow the remote T1 frame synchronizer to be maintain synchronization with the CO T1 frame synchronizer. Processing begins at start block 500 from which control is passed to decision process 502. In decision process 502 a determination is made as to whether a TDM header and associated TDM synch pointer has been encountered in the bit stream being processed by the payload deframer 238. If not, processing continues in process 504 using the existing VDSL clock from the VDSL frame synchronizer 244 for deframing the payload. When a pointer is encountered control is passed to process 506. In process 506 the bit value of the pointer is obtained and the start frame time 334 (See FIG. 3A) is obtained using the VDSL clock and stored in the time registers 306 (See FIG. 3A). Then in process 508 the number of pointer bits determined in process 506 is stored in register 310 (See FIG. 3A). Next in process 510 a count down counter is initialized with the pointer bit count determined in process 506 above. The down counter increments down one integer in value for each bit processed by the payload deframer within the TDM portion of the payload.

The bit streams of the various channels are processed, i.e. buffered in the corresponding channel buffers 240 and TDM demultiplexed in demultiplexer 242 (See FIG. 2). This continues until the downcounter has reached a null value as determined in decision process 514. When the downcounter reaches a null value the VDSL pointer time 330/336 is obtained from the VDSL frame synch. The value of the current time is written to register 312 and the value of the start TDM frame interval $I_S$ is computed and stored. Then in process 518 the total elapsed time, $I_R + I_S$ is determined by the VDSL time stamps in registers 306. This value is then compared in error detector 304 with the desired TDM frame interval of 0.125 us for example. Any difference between the two is an error or phase shift or TDM/SDM frame misalignment which needs to be corrected. In process 520 a phase shift is introduced into the T1 frame synch clock 300 and/or the VDSL clock via the frame aligner 302 to remove this error. Next in process 522 a counter is started to count the remaining bits in the TDM portion of the payload. The TDM portion of the payload is the portion from header 272 through the end of the TDM payload and includes the stuffing bits and end of payload mark 282. The remaining bits are the number of bits from the synch pointer to the end of the TDM payload. When in decision process 524 the end of payload is encountered control is passed to process 526. In process 526 the VDSL end frame time 332 (See FIG. 3A) time for the end of the TDM frame is stored in registers 306 and $I_R$ (See FIG. 3A) is computed.

In alternate embodiments of the invention the pointer value is first stored in multiple counters equal to the number of channels. Each channel has its own independent framer clock. The value of pointer is then divided by a specific number related to the portion of the payload capacity utilized by the channel. These independent channels use the new value of pointer and run their frame independently.

The foregoing description of a preferred embodiment of the invention has been presented for purposes of illustration and description. It is not intended to be exhaustive or to limit the invention to the precise forms disclosed. Obviously many modifications and variations will be apparent to practitioners skilled in this art. It is intended that the scope of the invention be defined by the following claims and their equivalents.

What is claimed is:

1. A system for provisioning a communication medium, and the system comprising:
   a pair of X-DSL modems configured to couple to one another via the communication medium and to communicate with one another over the communication medium via an X-DSL modulated communication channel;
   a first of the pair of X-DSL modems including:
      input buffers configured to accept input of at least one TDM communications channels together with at least one packet based communication channel and the at least one TDM communication channel including successive TDM frames;
      a payload framer coupled to the input buffers and the payload framer loading a corresponding portion of the at least one TDM communication channel into each X-DSL frame, together with a corresponding portion of the at least one packet based communications channel into a remaining portion of each X-DSL frame and the payload framer additionally loading each X-DSL frame with a parameter for synchronizing the frames of the at least one TDM communication channel on the first of the pair of X-DSL modems and a second of the pair of X-DSL modems; and
   the second of the pair of X-DSL modems including:
      a payload deframer for deframing both the at least one TDM communication channel together with the corresponding portion of the at least one packet based communications channel in each X-DSL frame from the first of the pair of modems, and
      a TDM frame synchronizer coupled to the payload deframer for synchronizing the TDM frames of the at least one TDM communication channel on the first of the pair of X-DSL modems and the second of the pair of X-DSL modems utilizing the synchronization parameter embedded in each X-DSL frame by the first of the pair of modems, thereby maintaining TDM frame synchronization despite variations in a number of bits transmitted in a unit of time on the X-DSL modulated communication channel.

2. The system of claim 1, wherein the at least one TDM communication channel comprises a first TDM communication channel and a second TDM communication channel each comprising one of: a full T1 service having 24 DS0 and a fractional T1 service having less than 24 DS0.

3. An X-DSL modem configured to couple to a communication medium for communication with an opposing modem via an X-DSL modulated communication channel, and the X-DSL modem comprising:
   input buffers configured to accept input of at least one TDM communication channel together with at least one packet based communication channel and the at least one TDM communication channel including successive TDM frames;
   a payload framer coupled to the input buffers and the payload framer loading a corresponding portion of the at least one TDM communication channel into each X-DSL frame, together with a corresponding portion of the at least one packet based communication channel into a remaining portion of each X-DSL frame and the payload framer additionally loading each X-DSL frame with a parameter for synchronizing the frames of the at least one TDM communication channel on the X-DSL modem and the opposing modem, thereby maintaining TDM frame synchronization despite variations in a number of bits transmitted in a unit of time on the X-DSL modulated communication channel.

4. The X-DSL modem of claim 3, wherein the at least one TDM communication channel comprises a first TDM communication channel and a second TDM communication channel each comprising one of: a full T1 service having 24 DS0 and a fractional T1 service having less than 24 DS0.

5. A method for provisioning an X-DSL modulated a communication medium, and the method comprising:
   accepting input of at least one TDM communication channel together with at least one packet based communication channel and the at least one TDM communication channel including successive TDM frames;
   loading a corresponding portion of the at least one TDM communication channel into each X-DSL frame;
   determining a space availability in each X-DSL frame;
   adding corresponding portions of the at least one packet based communication channel into each X-DSL frame loaded in the loading act, subject to the space availability determination in the determining act;
   loading each X-DSL frame with a parameter for synchronizing the frames of the at least one TDM communication channel despite variations in a number of bits transmitted in a unit of time on the X-DSL modulated communication channel.

6. The method of claim 5, wherein:
   the at least one TDM communication channel comprises a first TDM communication channel and a second TDM communication channel each comprising one of: a full T1 service having 24 DS0 and a fractional T1 service having less than 24 DS0.

* * * * *